United States Patent
Abe et al.

(10) Patent No.: US 6,580,433 B2
(45) Date of Patent: Jun. 17, 2003

(54) AUTOMATIC REVERSE METHOD FOR REVERSING THE BLACK-AND-WHITE MONOCHROME IMAGE, AND PRINTER UNIT USING THE SAME

(75) Inventors: Ikuyo Abe, Hyogo-ken (JP); Isao Sagawa, Hyogo-ken (JP); Katsuhiko Toda, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 280 days.

(21) Appl. No.: 09/799,096

(22) Filed: Mar. 6, 2001

(65) Prior Publication Data

US 2002/0126300 A1 Sep. 12, 2002

(51) Int. Cl.$^7$ ................................................. G09G 5/02
(52) U.S. Cl. .......................................... 345/589; 348/577
(58) Field of Search ................................. 345/289–605; 348/575–577

(56) References Cited

U.S. PATENT DOCUMENTS

| 4,788,535 A | * 11/1988 | Chikara et al. | 340/703 |
| 5,113,266 A | * 5/1992 | Sugiura | 358/426 |
| 5,659,673 A | * 8/1997 | Nonoshita | 395/131 |
| 5,915,037 A | * 6/1999 | Weber et al. | 382/181 |
| 6,297,796 B1 | * 10/2001 | Letts et al. | 345/134 |

FOREIGN PATENT DOCUMENTS

| JP | 63310274 A | * 12/1988 | H04N/1/413 |

* cited by examiner

Primary Examiner—Kent Chang
Assistant Examiner—Tom Sheng
(74) Attorney, Agent, or Firm—Armstrong, Westerman & Hattori, LLP

(57) ABSTRACT

The objective of this invention is to provide an automatic reverse method for reversing and displaying the black-white image into the white-black image under the predetermined condition, and a printer unit using the same method, specially a printer unit used in a plant operation. According to this invention, it would allow the printing operation to be accomplished merely by actuating a print button on operation device 10. The judgment of whether to reverse the black-and-white components, which was the responsibility of the operator in the prior art design, would be made automatically, and the human errors would be eliminated. The proportion of the black monochrome portion among the received black-and-white entire monochrome image. It displays either the received black-and-white monochrome image without any reversal if the proportion does not exceed a given value, or the reversed white-and-black monochrome image if the proportion exceeds the given value.

4 Claims, 6 Drawing Sheets

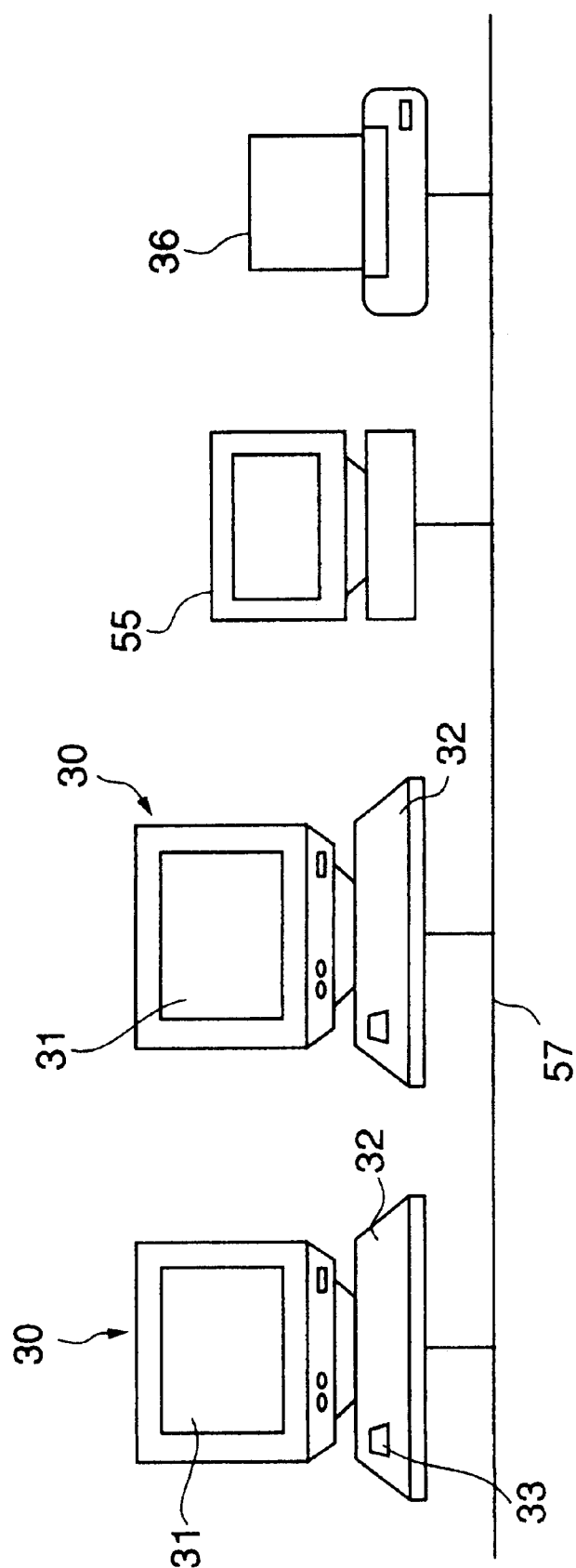

AUTOMATIC REVERSE METHOD FOR REVERSING THE BLACK-AND-WHITE MONOCHROME IMAGE, AND PRINTER UNIT USING THE SAME

BACKGROUND OF THE INVENTION

1. Field of the invention

This invention concerns an automatic reverse method for reversing the black-and-white monochrome image on a display, and a printer unit using the same method, specially a printer unit used in a plant operation. More specifically, it concerns an automatic reverse method for automatically reversing the received black-white monochrome image into the white-black monochrome image under predetermined condition. This method and printer unit is used for a monochrome image data transmitted from a process controller in a power plant or other plant.

2. Description of the Invention

Let us assume that data from a process control device are displayed on the monitor screen of an operation device, and that the content displayed on the monitor screen of the operation device is to be printed. Let us further assume that the printer to be used is a black-and-white (monochrome) printer, and that it prints the display exactly as it is. If a large proportion of the screen is black, the white portions of the resulting printout will be damaged, and it will be difficult or impossible to read correctly.

This problem is addressed in the prior art by having a human operator manually check the proportion of the black-and-white monochrome images on the monitor screen before printing what is shown on the monitor. He would then manually determine whether to reverse the black-white monochrome image into the white-black monochrome image or leave it alone, and he would submit the appropriate print command.

As is shown in FIG. 6, it is very common for prior art process control devices in a plant to be set up so that operation device 10 and printer 12 are physically separated from each other. When the content on monitor screen 11 of operation device 10 is to be printed by printer 12, the operator first checks the display to see if it has too much of a black component. If it does, he pushes button 15 on printer 12 to indicate that the black-and-white components of the monochrome image should be reversed. He then presses print button 14 on operation device 11 to request printing. Thus the operator has to perform two separate tasks before printing: 1) he must check the proportion of black to white areas on monitor 11, and 2) he must actuate the black-and-white reversal button on printer 12. He cannot simply start the printing operation.

The operator has to use the monitor display each time he wishes to print in order to judge whether to reverse the black-and-white components. This complicates the task and is a source of potential human error.

SUMMARY OF THE INVENTION

The objective of this invention is to provide an automatic reverse method for reversing and displaying the black-white monochrome image into the white-black monochrome image under the predetermined condition, and a printer unit using the same method, specially a printer unit used in a plant operation. According to this invention, it would allow the printing operation to be accomplished merely by actuating a print button on operation device 10. The judgment of whether to reverse the black-and-white components, which was the responsibility of the operator in the prior art design, would be made automatically, and the human errors would be eliminated.

This invention discloses a method to automatically reverse a received black-and-white monochrome image of control data into a white-and-black monochrome image, and displaying the received or reversed monochrome image on a display monitor. The black-and-white monochrome image includes both a black or relatively darker monochrome portion, and a white or relatively lighter monochrome portion in the received monochrome image. It is characterized by the following configuration. The method has a step of:

1) calculating the proportion of the black or relatively darker monochrome portion among the received black-and-white entire monochrome image;
2) judging whether or not the proportion of black or relatively darker monochrome portion exceeds a given value or not; and
3) controlling the displayed monochrome image, displaying either said received black-and-white monochrome image without any reversal if said proportion does not exceed said given value, or the reversed white-and-black monochrome image if the proportion exceeds the given value. In the reversed image, the black or relatively darker monochrome portion is replaced with the white or relatively lighter color in the white or relatively lighter monochrome portion, and the white or relatively lighter monochrome portion is replaced with the black or relatively darker color in the black or relatively darker monochrome portion.

This invention also discloses a print control device to automatically reverse a received black-and-white monochrome image of control data into a white-and-black monochrome image, and displaying the received or reversed monochrome image on a display monitor. The black-and-white monochrome image includes both a black or relatively darker monochrome portion, and a white or relatively lighter monochrome portion in the received monochrome image. The print control device comprises:

1) a calculating means to calculate the proportion of the black or relatively darker monochrome portion among the received black-and-white entire monochrome image;
2) a judging means to judge whether or not said proportion of black or relatively darker monochrome portion exceeds a given value or not; and
3) a controlling means to control the displayed monochrome image, displaying either the received black-and-white monochrome image without any reversal if the proportion does not exceed said given value, or the reversed white-and-black monochrome image if the proportion exceeds the given value. In the reversed image, the black or relatively darker monochrome portion is replaced with the white or relatively lighter color in the white or relatively lighter monochrome portion, and the white or relatively lighter monochrome portion is replaced with the black or relatively darker color in the black or relatively darker monochrome portion.

This invention further discloses a printer to print a monochrome image data provided with an automatic reversal device to automatically reverse a received black-and-white monochrome image of control data into a white-and-black monochrome image. The black-and-white monochrome image includes both a black or relatively darker monochrome portion, and a white or relatively lighter monochrome portion in the received monochrome image. The printer comprises:

1) a raster memory having an equal capacity for one frame of a monitor screen, which stores a bitmap of a control data to be displayed on a display monitor;
2) a counting means to count the number of pixels indicated by "1" or "0" in the bitmap;
3) a judging means to judge whether or not the proportion of the counted number of pixels among the received black-and-white entire monochrome image exceeds a given value or not; and
4) a controlling means to control the displayed monochrome image, displaying either the received black-and-white monochrome image without any pixel reversal in said bitmap if the proportion does not exceed the given value, or the reversed white-and-black monochrome image in which each pixel is reversed between "1" and "0" if the proportion exceeds the given value.

This invention further disclosed a printer specially used for plant operation. It prints a monochrome image data, and is provided with an automatic reversal device to automatically reverse a received black-and-white monochrome image of control data into a white-and-black monochrome image. The black-and-white monochrome image includes both a black or relatively darker monochrome portion, and a white or relatively lighter monochrome portion in the received monochrome image. The printer comprises:

1) a calculating means to calculate the proportion of the black or relatively darker monochrome portion based on a plant information and the background image information;
2) a judging means to judge whether or not the proportion of black or relatively darker monochrome portion exceeds a given value or not; and
3) a controlling means to control the displayed monochrome image, displaying either the received black-and-white monochrome image without any reversal if the proportion does not exceed the given value, or the reversed white-and-black monochrome image if the proportion exceeds the given value. In the reversed image, the black or relatively darker monochrome portion is replaced with the white or relatively lighter color in the white or relatively lighter monochrome portion, and the white or relatively lighter monochrome portion is replaced with the black or relatively darker color in the black or relatively darker monochrome portion.

As will be shown in the embodiment to follow, the reversal means to control the reversal of the image may be realized either by software or by hardware.

With this invention mentioned above, when the operator actuates a print command, the operation device in and of itself can control the black-and-white reversal and produce a print. The operator no longer needs to check the display screen and determine whether to reverse the black-white image into the white-black image before printing.

BRIEF DESCRIPTION OF THE DRAWINGS

FIG. 5 illustrates a network in which a print request from operation device is handled through printer server installed separately from the operation device.

DETAILED DESCRIPTION OF THE PROFFERED EMBODIMENT

In the following section we shall give a detailed explanation of the invention with reference to the drawings. Insofar as the circuit components, control state, relative position of circuit components, or other features of the constitutive circuitry disclosed in this embodiment are not exhaustively delineated, they are not intended to limit the scope of the invention, but serve merely as examples to clarify the explanation.

Figure 1:
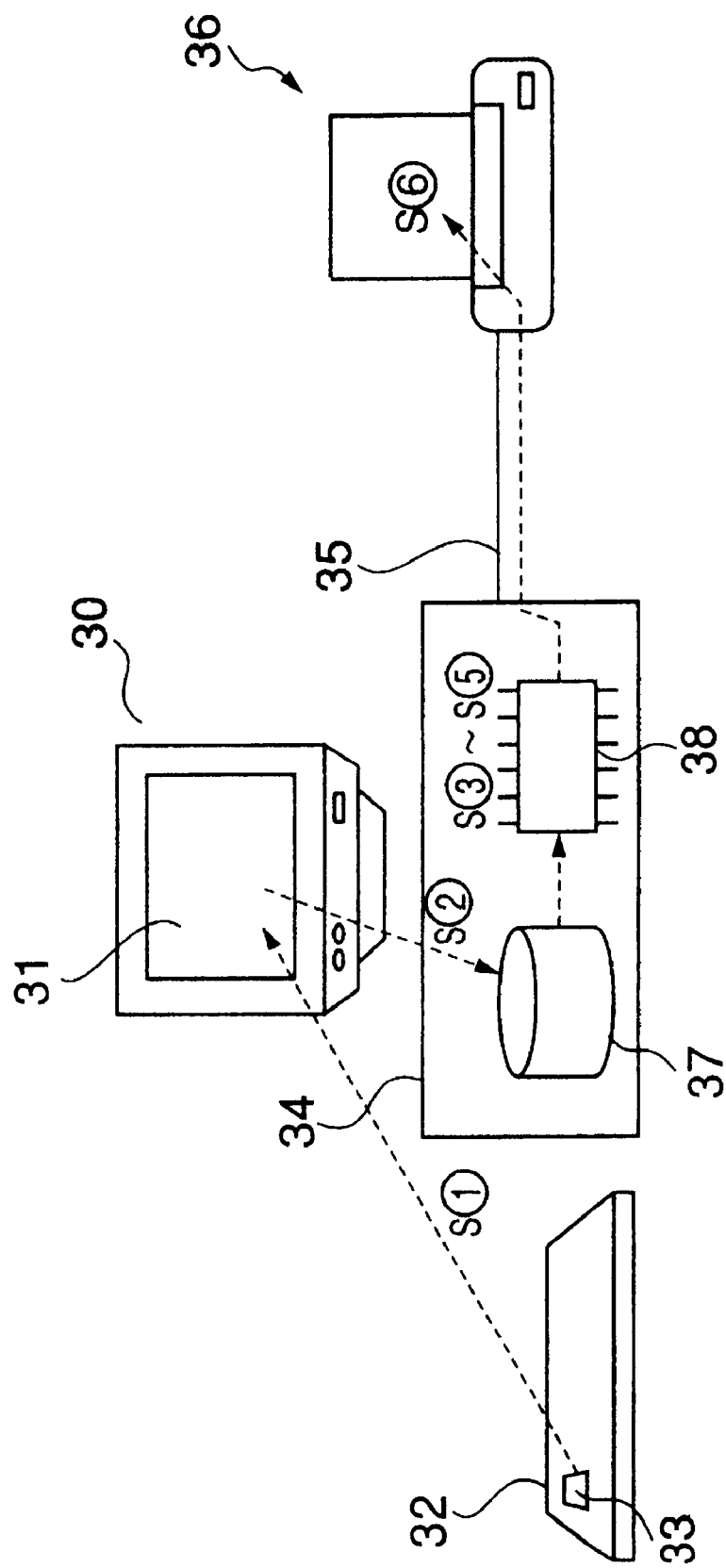
FIG. 1 illustrates operation device which displays on monitor screen the data from the process control device provided in an electric power plant and a like, and prints the data by a monochrome printer.

As shown in FIG. 1, operation device 30 displays on monitor screen 31 the data from the process control device provided in an electric power plant and a like, and prints the data by a monochrome printer. For displaying the data on the monitor screen 31, operation device 30 changes the data into a bitmap format.

Figure 2:
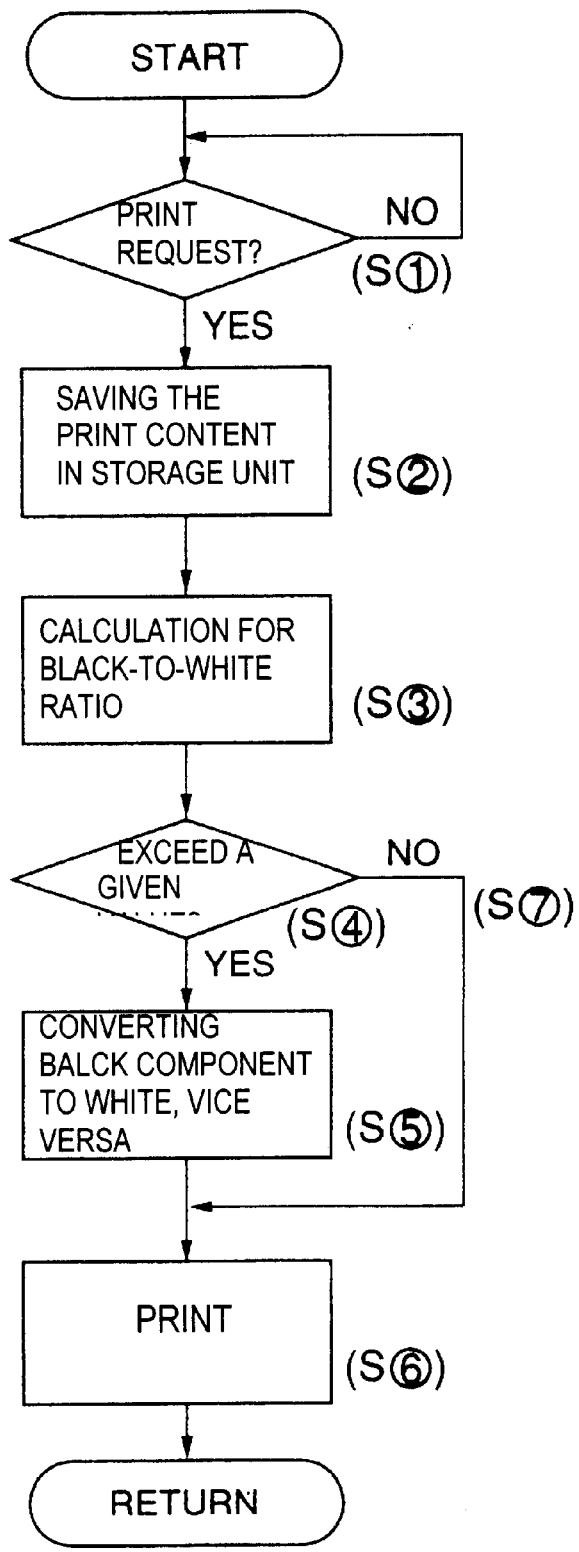
FIG. 2 illustrates the flow-chart of the operation to control the black-and-white reversal. It reverses the black and white by software.

We shall explain the operation to control the black-and-white reversal that occurs at this point with reference to the flow chart which appears in FIGS. 1 and 2. The operator presses print button 33 on keyboard 32 to request a print (Step 1). Operation device 30 interfaces with the content on monitor screen 31 which is supposed to be printed and saves it in storage unit 37, a hard disk or RAM (Step 2) in operation device 30. Print control device 34 in operation device 30, which comprises CPU 38 and others, calculates the black-to-white ratio of the stored image (Step 3). Based on the result of the calculation, it determines whether a percentage description of the black component exceeds a given value (Step 4). If it does, print control device 34 transposes the image by converting its black component to white and its white component to black (Step 5). It transmits the transposed data to printer 36 via transmission cable 35 and has them printed (Step 6). If the percentage of the image occupied by the black component is below a given value, print control device 34 transmits the image displayed on monitor screen 31 without transposing it to printer 36 via transmission cable 35 and has it printed just as it is (Step 7).

Figure 3:
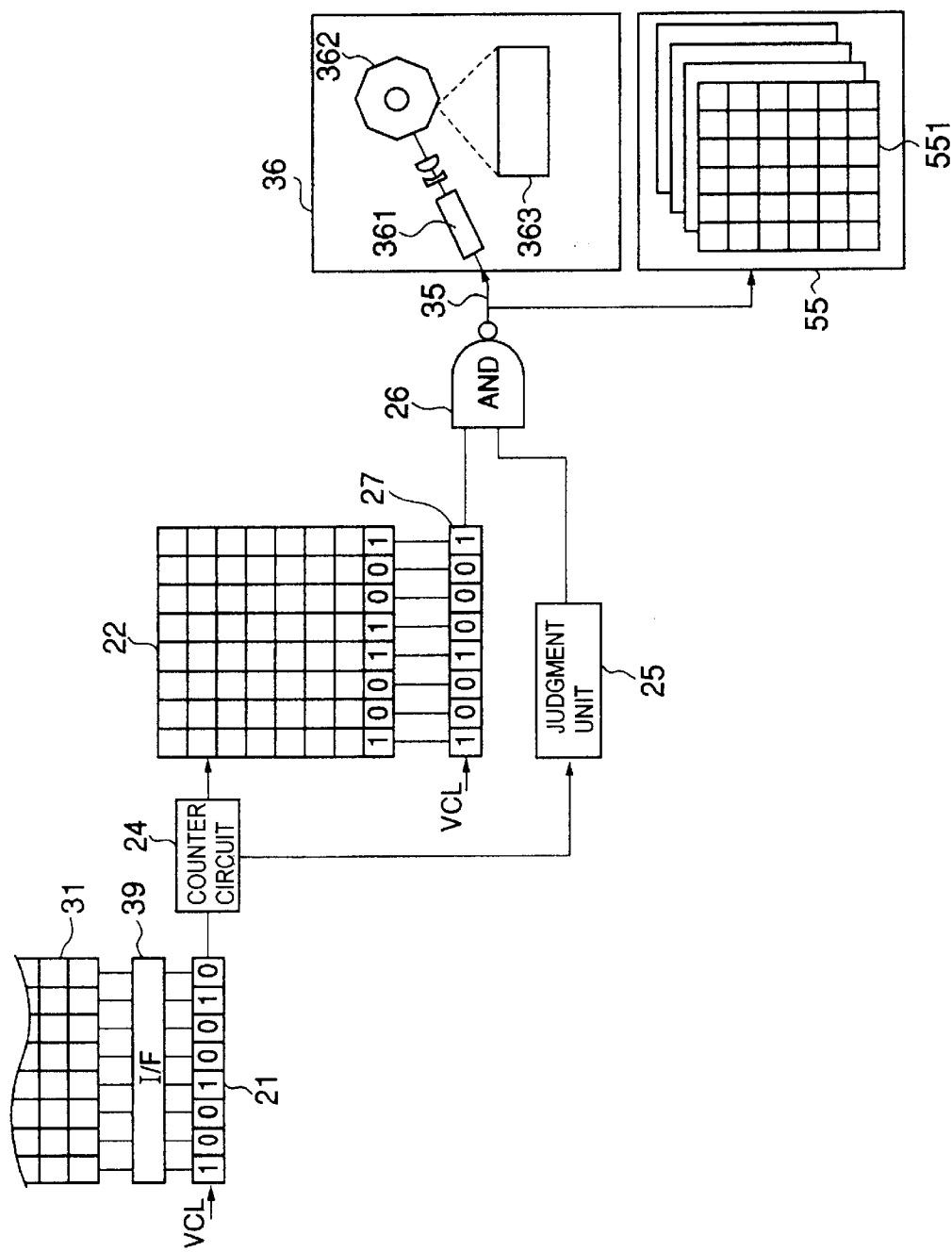
FIG. 3 illustrates a block diagram showing how to realize the black-white reversal by hardware according to another preferred embodiment of this invention.

FIG. 3 is a block diagram showing how to realize the print control device to control black-white reversal by hardware. 21 is an n-bit shift register which reads in the digital image signals representing the bitmap of the image on monitor screen 31. The signals are input in parallel via interface 39 in array units(one array would equal n bits). The shift register 21 reads in one array of digital image signals in clock units whose VCL (V clock) frequencies have been divided into n cycles. In other words, it reads the data in, in parallel, as units of n bits. Black bits are "1", white bits are "0", and there is an 1/0 signal for each array.

22 is a video memory (or raster memory) with a number of raster memory elements (n×m) equal to one frame of the monitor screen 31. The digital image signals (i.e., the 1/0 signals) for each array read into the shift register 21 are synchronized with a V clock and transmitted and read in serially. The parallel data transmission from the monitor screen 31 to shift register 21 and from shift register 21 to video memory 22 is repeated m times. In this way digital image signals representing the entire screen of monitor screen 31 are written into the video memory 22 and stored there. The design is widely known.

In this embodiment, there is a counter circuit 24 on the serial transmission line between the shift register 21 and video memory 22. The counter circuit 24 counts the black bits, that is, the "1" signals, transmitted serially by shift register 21. When the serial transmission to video memory 22 has been repeated m times, the counter circuit 24 will have counted all the black bits among the digital image signals which represent one entire frame on monitor screen 31.

The count value is input into judgment unit 25, which determines whether the proportion of black bits L/n×m exceeds a given value. If it does, a "reverse" signal (a "1" signal) is sent to reversal circuit 26 when a command to print the monitor screen 31 is issued. If the proportion of black bits L/n×m is below the given value, a "don't reverse" signal (a "0" signal) is sent to reversal circuit 26 when a print command to print the monitor screen 31 is issued. The print data which are serially transmitted from the video memory 22 through shift register 27 to reversal circuit 26 array by array (of n bits) are either reversed or left alone, and then the data are sent to printer 36 via transmission cable 35 and printed.

In other words, the arrays of video data (print data) from the video memory 22 are written as parallel n-bit units into shift register 27 in clock units created by splitting a VCL (V clock) into n cycles. Each array of print data written into the shift register 27 is synchronized with the V clock and transmitted serially to reversal circuit 26. If a "reverse" signal is sent to the reversal circuit 26, it takes both ANDs and reverses the print data. If a "don't reverse" signal is sent to the reversal circuit 26, the print data are sent to printer 36 via transmission cable 35 just as they are, without being reversed.

In this embodiment, it is also possible to reverse not the entire frame but only that portion of it which has a large black area in it.

The printer 36 may, for example, be a laser printer. The laser printer 36, as is well known, consists of semiconductor laser 361, which outputs a modulated beam based on the print data; optical system 362, a polygonal mirror which deflects and scans the modulated beam in the main scanning direction after it has been collimated; light-sensitive drum 363, which forms a latent image in dots based on the modulated beam which is deflected and scanned; and an imaging device (not pictured), which causes the latent image written onto the drum 363 to appear and transfers it to recording paper.

In addition to the application shown in FIG. 1, in which operation device 30 and printer 36 are directly connected to each other, this embodiment could also be realized as shown in FIG. 5, in which printer 36 is a part of network 57, and a print request from operation device 30 is handled through printer server 55, which is separate from operation device 30. In this way when a single system has several operation devices 30, the monitor screen of any of the operation devices 30 can be printed when a request is received from that operation device 30.

In such a case, the print data from the reversal circuit 26 are not sent directly to printer 36. Instead, the printer server 55 has a large number of raster memories 551, each of which has a number of raster elements (n×m) equal to one frame on monitor screen 31, just as in video memory 22 in the FIG. 3. The reversed or non-reversed print data for the appropriate screen are read out of the raster memory where they are stored so that printer 36 can print them.

Figure 4A:
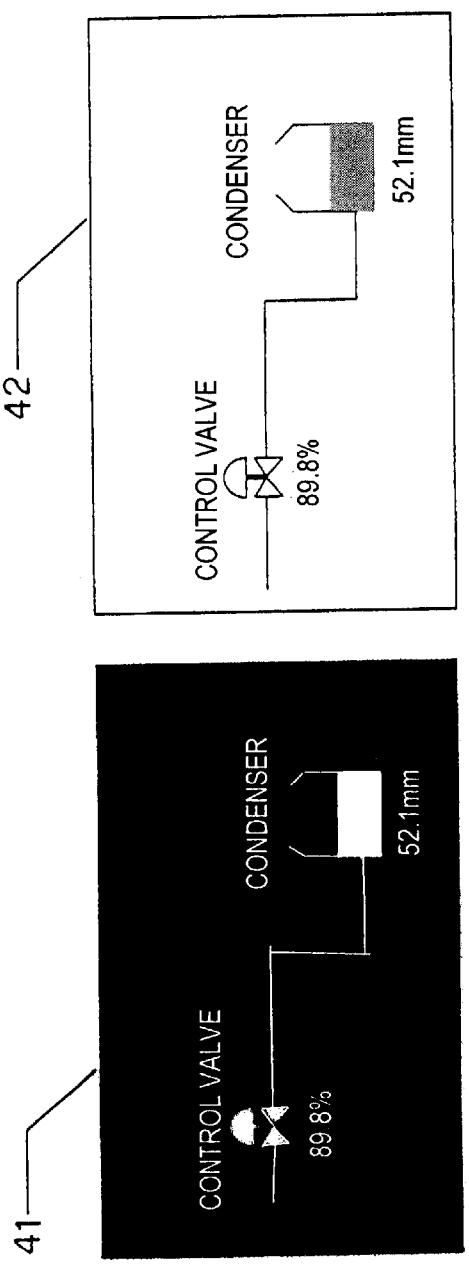
FIG. 4(A) illustrates an image example displayed on a display screen, and the reversed image printed by the printer according to this invention.
Figure 4B:
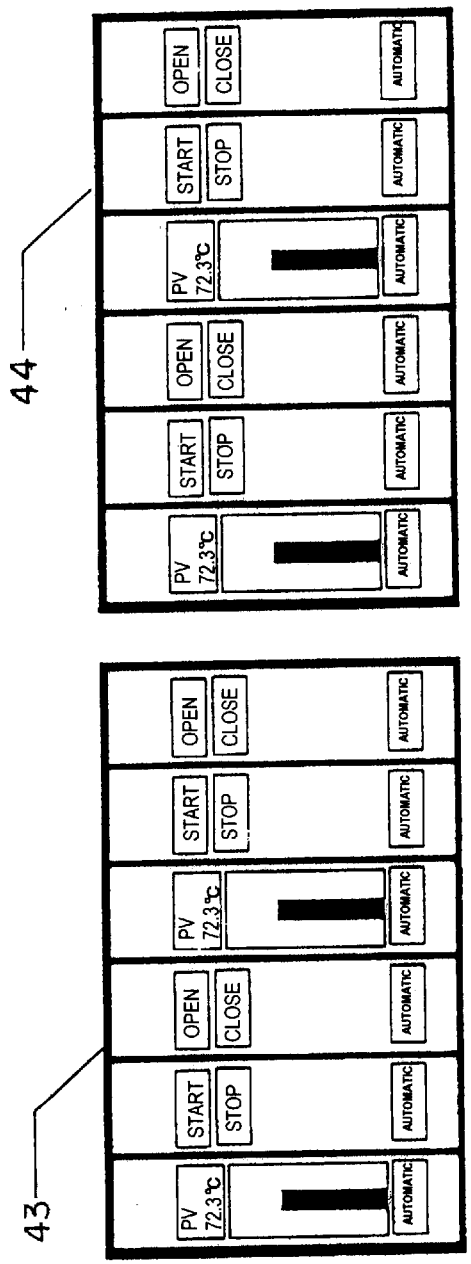
FIG. 4(B) illustrates an image example displayed on a display screen, and the not reversed image printed by the printer.
Figure 6:
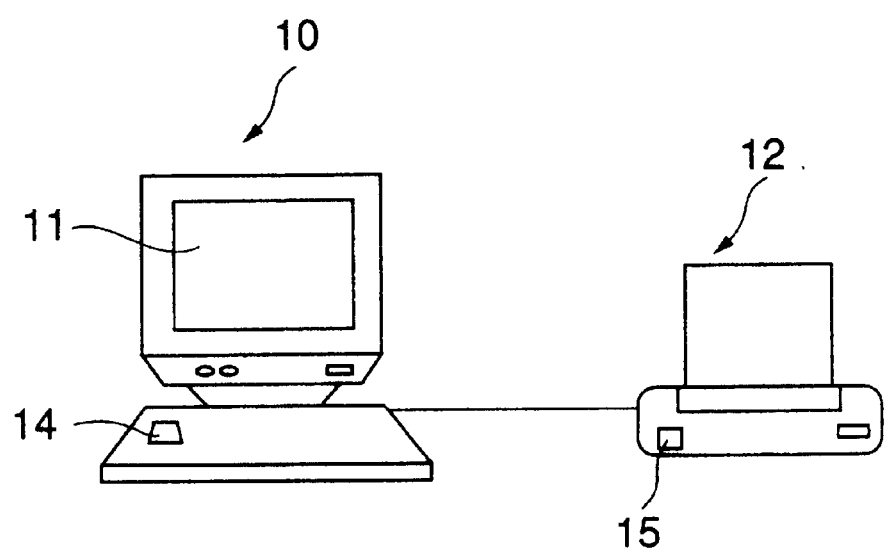
FIG. 6 illustrates an operation device according to a prior art. In this device, an image displayed on the monitor screen is printed out as it is.

FIG. 4 shows an example in which the operation device 30 is used to print the data displayed on monitor screen 31. 41 is an example of the image which might actually be displayed on monitor screen 31. In this example, since a large portion of the screen is taken up by the black background, operation device 30 will automatically reverse the black and white, and printer 36 will print reversed image 42 which has a white-background. 43 is an example of an image in which the proportion of black pixels in the image data is small. In this example, operation device 30 will not reverse the image, and printer 36 will print it as is to produce image 44.

As is discussed above, this invention eliminates the need for the operator to check the image displayed on the screen when a print request is made in order to determine whether the black and white portions should be reversed before it is printed. It thus prevents human error from occurring. Furthermore, since the operation device checks the data automatically the instant a print request is made, the image can be printed without delay.

What is claimed is:

1. A method to automatically reverse a received black-and-white monochrome image of control data into a white-and-black monochrome image, and displaying said received or reversed monochrome image on a display monitor, said black-and-white monochrome image including both a black or relatively darker monochrome portion, and a white or relatively lighter monochrome portion in said received monochrome image, comprising a step of:

calculating the proportion of said black or relatively darker monochrome portion among said received black-and-white entire monochrome image;

judging whether or not said proportion of black or relatively darker monochrome portion exceeds a given value or not; and controlling the displayed monochrome image, displaying either said received black-and-white monochrome image without any reversal if said proportion does not exceed said given value, or said reversed white-and-black monochrome image if said proportion exceeds said given value, in which said black or relatively darker monochrome portion is replaced with the white or relatively lighter color in said white or relatively lighter monochrome portion, and said white or relatively lighter monochrome portion is replaced with the black or relatively darker color in said black or relatively darker monochrome portion.

2. A print control device to automatically reverse a received black-and-white monochrome image of control data into a white-and-black monochrome image, and displaying said received or reversed monochrome image on a display monitor, said black-and-white monochrome image including both a black or relatively darker monochrome portion, and a white or relatively lighter monochrome portion in said received monochrome image, comprising:

a calculating means to calculate the proportion of said black or relatively darker monochrome portion among said received black-and-white entire monochrome image;

a judging means to judge whether or not said proportion of black or relatively darker monochrome portion exceeds a given value or not; and a controlling means to control the displayed monochrome image, displaying either said received black-and-white monochrome image without any reversal if said proportion does not exceed said given value, or said reversed white-and-black monochrome image if said proportion exceeds said given value, in which said black or relatively darker monochrome portion is replaced with the white or relatively lighter color in said white or relatively lighter monochrome portion, and said white or relatively lighter monochrome portion is replaced with the black or relatively darker color in said black or relatively darker monochrome portion.

3. A printer to print a monochrome image data provided with an automatic reversal device to automatically reverse a received black-and-white monochrome image of control data into a white-and-black monochrome image, said black-and-white monochrome image including both a black or relatively darker monochrome portion, and a white or relatively lighter monochrome portion in said received monochrome image, comprising:

a raster memory having an equal capacity for one frame of a monitor screen, which stores a bitmap of a control data to be displayed on a display monitor;

a counting means to count the number of pixels indicated by "1" or "0" in the bitmap;

a judging means to judge whether or not the proportion of said counted number of pixels among said received black-and-white entire monochrome image exceeds a given value or not; and a controlling means to control the displayed monochrome image, displaying either said received black-and-white monochrome image without any pixel reversal in said bitmap if said proportion does not exceed said given value, or said reversed white-and-black monochrome image in which each pixel is reversed between "1" and "0" if said proportion exceeds said given value.

4. A printer used for plant operation to print a monochrome image data, provided with an automatic reversal device to automatically reverse a received black-and-white monochrome image of control data into a white-and-black monochrome image, said black-and-white monochrome image including both a black or relatively darker monochrome portion, and a white or relatively lighter monochrome portion in said received monochrome image, comprising:

a calculating means to calculate the proportion of said black or relatively darker monochrome portion based on a plant information and the background image information;

a judging means to judge whether or not said proportion of black or relatively darker monochrome portion exceeds a given value or not; and a controlling means to control the displayed monochrome image, displaying either said received black-and-white monochrome image without any reversal if said proportion does not exceed said given value, or said reversed white-and-black monochrome image if said proportion exceeds said given value, in which said black or relatively darker monochrome portion is replaced with the white or relatively lighter color in said white or relatively lighter monochrome portion, and said white or relatively lighter monochrome portion is replaced with the black or relatively darker color in said black or relatively darker monochrome portion.

\* \* \* \* \*